United States Patent [19]

Love

[11] Patent Number: 5,131,780

[45] Date of Patent: Jul. 21, 1992

[54] C-CLAMP

[75] Inventor: Dale Love, Nappanee, Ind.

[73] Assignee: Grrreat Creations, Inc., Nappanee, Ind.

[21] Appl. No.: 495,167

[22] Filed: Mar. 19, 1990

[51] Int. Cl.⁵ ..................... F16B 7/04; A44B 21/00
[52] U.S. Cl. ................... 403/290; 403/373; 24/525; 24/522; 24/569; 269/249
[58] Field of Search .............. 269/249, 244; 24/514, 24/569, 490, 522, 525; 403/344, 290, 373

[56] References Cited

U.S. PATENT DOCUMENTS

| | | | |
|---|---|---|---|
| 789,513 | 5/1905 | White | 24/569 X |
| 1,241,459 | 9/1917 | Woodard | 269/249 X |
| 1,877,781 | 9/1932 | Akerlund | 24/569 X |
| 2,169,064 | 8/1939 | Williams | 269/249 X |
| 3,170,708 | 2/1965 | Miller | 269/249 X |
| 4,846,431 | 7/1989 | Pflieger | 24/514 X |
| 4,901,963 | 2/1990 | Yoder | 269/249 X |
| 4,979,273 | 12/1990 | Friedrickson, Jr. et al. | 24/522 X |

FOREIGN PATENT DOCUMENTS 2063149  6/1981  United Kingdom ............ 269/249

Primary Examiner—Peter M. Cuomo
Attorney, Agent, or Firm—James D. Hall

[57] ABSTRACT

A clamp having an L-shaped body member and a U-shaped body member laterally shiftably connected relative to one another by a bolt.

7 Claims, 2 Drawing Sheets

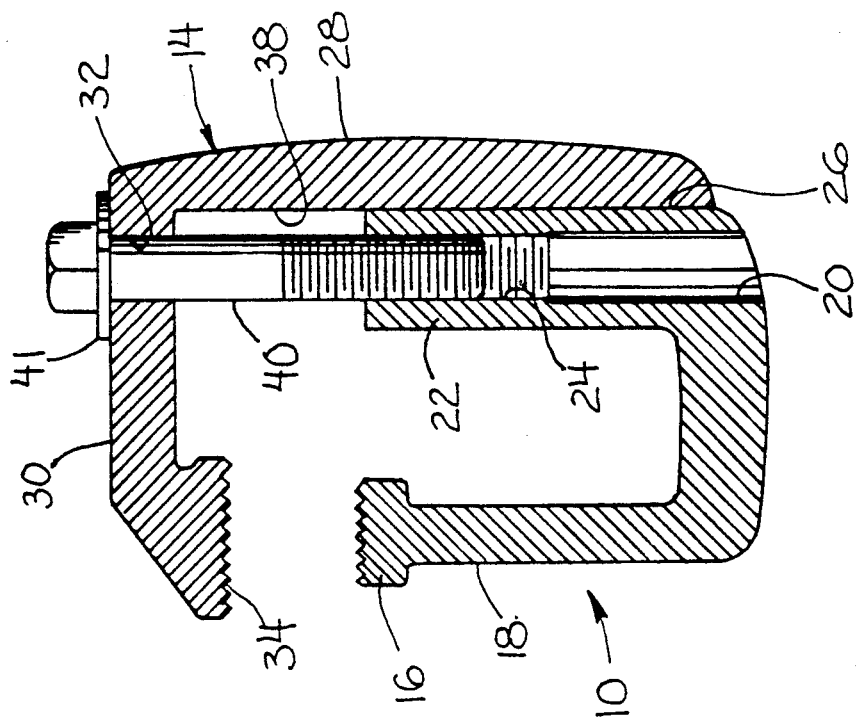
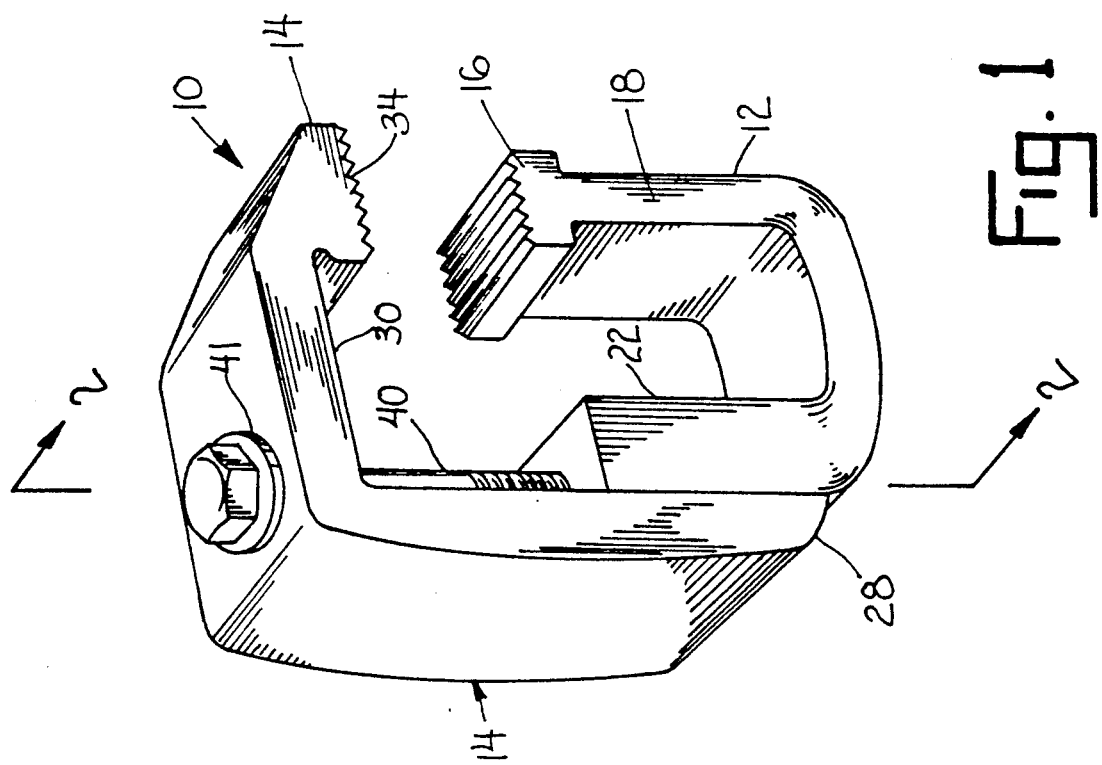

5,131,780

C-CLAMP

FIELD OF THE INVENTION

This invention relates to a lamp and will have relevance to a C-clamp for attaching a pickup truck cap to the truck bed.

BACKGROUND OF THE INVENTION

Truck bed caps commonly used on pickup trucks for enclosing the truck's bed are typically removably attached to the truck bed by a plurality of pivotal clamps.

Heretofore, the clamp included two clamping parts pivotally connected to one another and adjustable by a bolt. However, one problem associated with the use of this type of clamp is that due to the pivotal interconnection of the two clamp halves the clamping strength is weakened when the clamping surfaces are not substantially parallel as would be experienced when attempting to clamp thick objects together.

SUMMARY OF THE INVENTION

This invention eliminates problems experienced with the previous truck bed clamps by providing a two piece clamp wherein the two clamping surfaces are shifted longitudinally relative to one another by a connecting bolt. Longitudinally shifting the clamping surfaces as opposed to a pivotal arrangement permits the clamp to securely held fast over a range of material thicknesses.

Accordingly, it is an object of this invention to provide for a novel clamp.

Another object of this invention is to provide for a clamp having two clamping surfaces longitudinal shiftable relative to one another.

Another object of this invention is to provide for a clamp to secure a truck bed cap to the side wall of a pickup truck bed.

Other objects of this invention will become apparent upon a reading of the following description taken with the accompanying drawings.

BRIEF DESCRIPTION OF THE DRAWINGS

FIG. 1 is a perspective view of the clamp of this invention.

FIG. 2 is a vertical sectional view taken along lines 2—2 of FIG. 1.

DESCRIPTION OF THE PREFERRED EMBODIMENT

Figure 3:
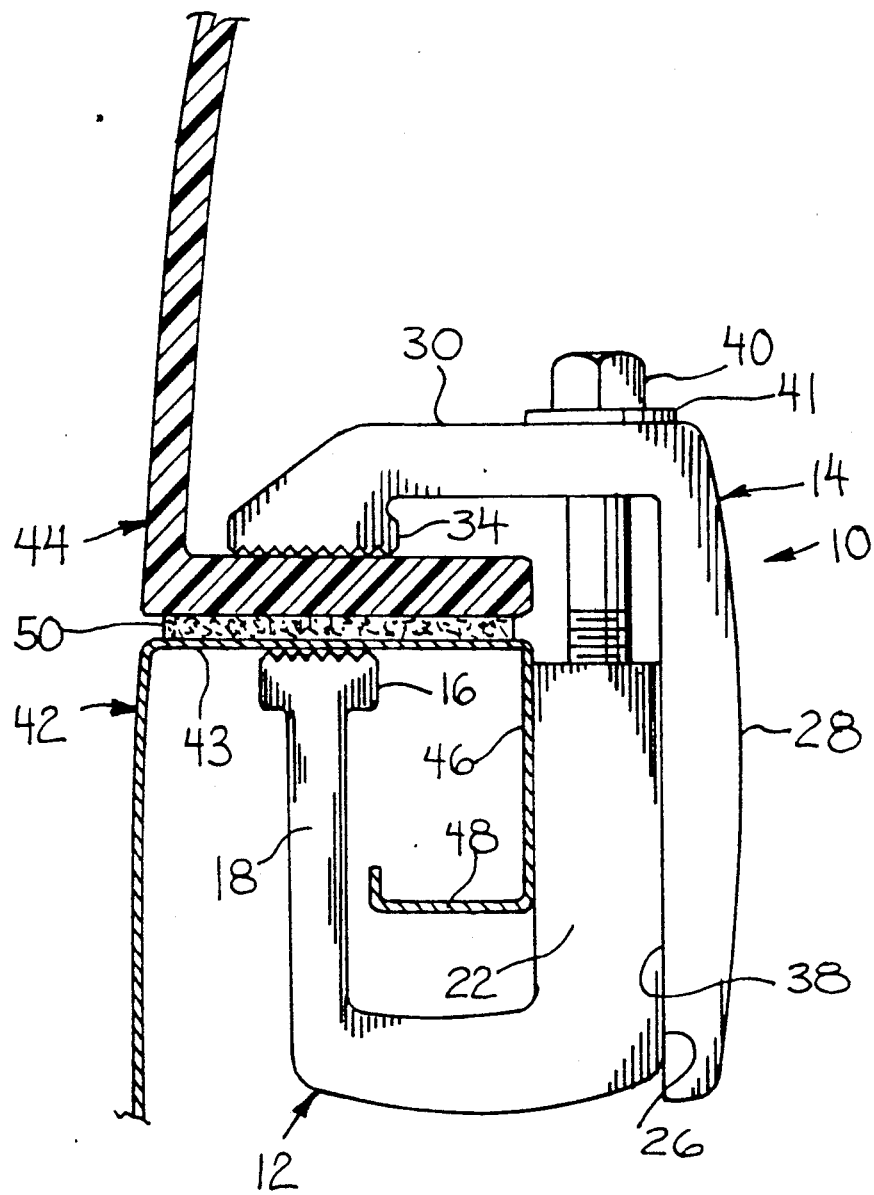
FIG. 3 is a side elevational view of the clamp of this invention in use with a pickup truck bed side wall and cap shown in fragmented sectional form.

The preferred embodiment herein described is not intended to be exhaustive or to limit the invention to the precise forms disclosed. Rather it is chosen and described so that others skilled in the art can utilize its teachings.

Referring now to the drawings, clamp 10 includes a two piece body construction having a generally U-shaped body part 12 and a generally L-shaped body part 14. As illustrated U-shaped body part 12 includes an integral grooved clamping pod 16 on one leg 18. A bore 20 extends through the opposite leg 22 of U-shaped body part 12. Bore 20 is internally threaded at 24 for a partial distance of its length. As is illustrated best in FIG. 2, le 22 of U-shaped body part 12 is thicker in cross section than leg 18 to accommodate bore 20 with sufficient wall thickness to provide the required strength for the clamp. Leg 22 includes a flat outer surface 26

L-shaped body part 14 includes a leg 28 and an arm 30. A bore 32 extends through arm 30 adjacent leg 28 as shown. A grooved clamping pod 34 is located at the free end of arm 30. Leg 28 includes a flat inner surface 38.

Body parts 12 and 14 are interconnected by a bolt 40 having its shank extending through bore 32 of L-shaped body part 14 and threadibly accommodated within threaded portion 24 of bore 20. A washer 41 is carried by bolt 40 and positioned between the head of the bolt and body part 14. Body parts 12 and 14 when interconnected by bolt 40 are positioned such that the smooth outer surface 26 of U-shaped body part 12 slidably contacts smooth inner surface 38 of L-shaped body part 14. With bolt 40 interconnecting body parts 12, 14 as described, clamping pods 16 and 34 are in facing alignment. The distance between pods 16 and 34 may be varied by rotating bolt 40 within bore 20.

FIG. 3 illustrates the use of clamp 10 in association with a pickup truck bed side rail 42 and a truck cap lower flange 44 shown in fragmented sectionalized form only. It should be noted that as typical, truck bed side rail 42 includes a horizontal wall 43, an inner downturned vertical flange 46 and an inturned lip 48. The inner flange 46 and lip 48 of truck bed side rail 42 is accommodated by U-shaped body member 12 as illustrated in FIG. 3. It is typical that a resilient spacer 50 made from material such as sealant foam or rubber be positioned between the truck cap flange 44 and side wall rail 42 as illustrated. In use, initially bolt 40 is turned outwardly from bore 20 so that the truck bed cap flange 44 and truck side rail 42 are positioned with clearance between clamping pods 16 and 34. When appropriately positioned, bolt 40 is turned within threaded bore 20 to draw pods 16 and 34 toward each other to clamp the truck bed rail 42 and cap 44 together. It should be noted that as bolt 40 is turned within threaded bore 20, smooth surfaces 38 and 26 of the body parts slide over one another to maintain the clamping pods essentially parallel. It is preferable that the pods remain substantially parallel while engaging the structures to be clamped to ensure a maximum clamping force It should be noted that the clamping force exerted upon the clamping pods 16 and 34 originates from bolt 40 which is longitudinally aligned with the clamp. Further the sliding engagement of surfaces 26 and 38 provide stability to the clamp such that a plurality of various thicknesses of material can be clamped together while maintaining the integrity of the clamp.

It should be understood that the invention is not to be limited to the precise forms disclosed above but rather may be modified within the scope of the appended claims.

I claim:

1. A clamp comprising a body having first and second body parts, said first body part including an arm carrying a clamping pod and a spaced leg having a flat surface extending therealong, said second body part including a clamping pod and a spaced leg having a flat surface extending therealong, said clamping pods being oppositely positioned from each other, said first body part flat surface slidably engaging said second body part flat surface with said legs being shiftable longitudinally relative to the other to move said pods toward and away from each other, said slidable engagement of said flat surfaces of said body parts constituting means for maintaining said pods substantially parallel relative to one another as said legs are shifted, a rotatable threaded fastener device extending between said first and second body parts and constituting means upon rotation for shifting said legs longitudinally relative to each other and moving said clamping pods, said fastener device extending through said first body part between said pod and said flat surface thereof, said fastener device also extending at least partly into said second body part between said pod and said flat surface thereof.

2. The claim of claim 1 wherein said fastener device extends through said arm of said first body part.

3. The clamp of claim 2 wherein said fastener device is threadably accommodated within said leg of said second body part.

4. A clamp comprising a body having first and second body parts, said first and second parts each including a clamping pod, each of said first and second body parts further defining a smooth surface, each smooth surface being substantially flat, said body parts shiftably connected to one another by a fastener device such that the smooth surface of said one body part slidably engages the smooth surface of the other of said body parts as said fastener device is rotated to shift said body parts longitudinally relative to one another wherein said clamping pods of said first and second body parts are shifted relative to one another, said slidable engagement of one of said smooth surfaces of one of said body parts with the smooth surface of the other of said body parts constituting means for maintaining said pods substantially parallel relative to one another as said parts are shifted, said first body part being generally U-shaped and including an integral pair of parallel legs connected by an integral cross portion, a said clamping pod being carried by one of said legs, the smooth surface of said first body part being formed on the other of said legs, said second body part including an arm carrying its said pod, wherein said smooth surface of said first body part is substantially parallel to said legs, said fastener device extending through said second body part arm between the pod and smooth surface of said second body part and being secured to first body part between said pod end said smooth surface thereof.

5. The clamp of claim 4 wherein said smooth surface of said first body part slidably engages said leg portion of said second body part as said body parts are longitudinally shifted relative to one another by said fastener device, said smooth surface of said second body part slidably engaging one of said legs of said first body part as said body parts are shifted relative to one another by said fastening device, said slidable engagement of said smooth surfaces with said body parts constituting means for maintaining said pods substantially parallel relative to one another as said body parts are laterally shifted.

6. A clamp comprising a body having first and second body parts, said first and second body parts each including a clamping pod, each of said first and second body parts further defining a smooth planar surface opposite its said pod, said body parts shiftably connected by a fastener device threadably accommodated within at least one of said body parts adjacent its said smooth planar surface such that said smooth planar surfaces mutually slidably engage as said fastening device is rotated to shift said body parts longitudinally relative to one another wherein said clamping pods of said first and second body parts are laterally shifted relative to one another, said first body part being generally U-shaped and including an integral pair of parallel legs connected by an integral cross portion, a threaded bore being formed to extend longitudinally through one of said legs of said first body part for threadably accommodating said fastener device, said clamping pod of said first body part being carried by the other of said legs, said second body part being generally L-shaped and having a leg portion and an arm portion, a transverse bore being formed through said arm portion and being aligned with said threaded bore for accommodating said fastener device with the clamping pod of said second body part protruding from said arm portion, said smooth planar surface of said first body part being formed along said leg having said threaded bore, said smooth planar surface of said second body part being formed along said leg portion adjacent said transverse bore, said mutual slidable engagement of said smooth planar surfaces constitutes means for maintaining said pods substantially parallel relative to one another as said body parts are shifted relative to one another.

7. In combination, a clamp comprising a body having first and second body parts, said first body part including an arm carrying a clamping pod and a spaced leg having a flat surface extending therealong, said second body part including a clamping pod and a spaced leg having a flat surface extending therealong, said clamping pods being oppositely positioned from each other, said first body part flat surface slidably engaging said second body part flat surface with said legs being shiftable longitudinally relative to the other to move said pods toward and away from each other, said slidable engagement of said flat surfaces of said body parts constituting means for maintaining said pods substantially parallel relative to one another as said legs are shifted, a rotatable threaded fastener device extending between said first and second body parts and constituting means upon rotation for shifting said legs longitudinally relative to each other and moving said clamping pods, said fastener device extending through said first body part between said pod and said flat surface thereof, said fastener device also extending at least partly into said second body part between said pod and said flat surface thereof, and a vehicle bed side rail and a vehicle bed cap, said vehicle bed side rail including a horizontal wall and a vertical lip extending therefrom, said vehicle bed cap including a vertical side wall and a lower inturned horizontal wall, said bed side rail horizontal wall and said bed cap horizontal wall being positioned adjacent one another, said first body part of said clamp accommodating said lip of said vehicle said rail such that the said pod of the first body part contacts a lower side of said side rail horizontal wall, said second body part of said clamp accommodating said bed cap inturned wall such that said pod of said second body part contacts an upper side of said inturned wall, wherein rotation of said fastener device in one direction causes said body parts to laterally shift relative to one another to draw said pods into clamping engagement with said horizontal wall of said vehicle side rail and said bed cap inturned wall, rotation of said fastener device in a second direction causes said body parts to laterally shift away from one another to pull said clamping pods away from said clamping engagement with said horizontal wall of said vehicle side rail and bed cap inturned wall.

* * * * *